United States Patent Office 3,117,977
Patented Jan. 14, 1964

3,117,977
SELECTED 2,4-BIS(PERHALOALKYL)-2,4-DIFLUORO-1,3-DITHIETANES
William J. Middleton, Claymont, Del., assignor to E. I. du Pont de Nemours and Company, Wilmington, Del., a corporation of Delaware
No Drawing. Filed Aug. 17, 1959, Ser. No. 833,992
3 Claims. (Cl. 260—327)

This invention relates to, and has as its principal object provision of, novel and stable 2,4-bis(perhaloalkyl)-2,4-difluoro-1,3-dithietanes of the structure

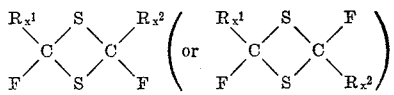

wherein $R_x^1$ and $R_x^2$ represent perhaloalkyl groups of 1 to 3 carbons each and wherein up to one halogen is chlorine, the remainder of the halogen being fluorine.

A preferred method of preparing the dithietanes of this invention is by dimerization of the appropriate perhalothioacyl fluorides, e.g., a perfluorothioacyl fluoride or monochloroperfluorothioacyl fluoride or mixtures thereof, by irradiation of the same with ultraviolet light. Any convenient source of ultraviolet light can be used. For example, any of the commercially available lamps that are relatively high in ultraviolet output are suitable. Generally speaking, mercury vapor arc lamps are preferred since they provide a relatively intense source of ultraviolet light. Many lamps of this type are available and they include low and high pressure lamps with various types of envelopes. The most preferred are those with quartz envelopes since such envelopes permit higher transmission of ultraviolet light.

Preferably the thioacyl fluoride is dissolved in an inert solvent before the irradiation. Convenient solvents are highly halogenated hydrocarbons such as dichlorodifluoromethane.

The exact temperature and pressure at which the dimerization in the presence of ultraviolet light is accomplished are not critical, but depend on the specific solvent and reactant. It is convenient to use room temperature and atmospheric pressure but lower or higher temperatures and pressures can be employed if desired. Conditions at or near the boiling point of the solvent utilized are convenient. Liquid phase reaction conditions are preferred.

The time required for the dimerization varies somewhat with the fluorothioacyl fluoride being irradiated. When perfluorinated compounds are employed, dimerization is usually substantially complete within a few hours, e.g., 1–5, although longer periods, e.g., up to several days, can be used particularly with actinic radiation of low intensity.

There follow some examples which illustrate, but do not limit, the invention. In them, pressures are ambient atmospheric and temperatures are as indicated.

EXAMPLE I 2,4-Bis(Trifluoromethyl)-2,4-Difluoro-1,3-Dithietane

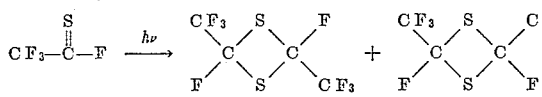

A quartz reaction vessel equipped with a condenser cooled with solid carbon dioxide and swept with nitrogen is charged with 25 cc. (as liquid) of dichlorodifluoromethane and 10 cc. (15 g.) of trifluorothioacetyl fluoride. The vessel is irradiated with a mercury resonance lamp for three hours. During irradiation, condensation on the flask is avoided by enclosing both lamp and flask in a polyethylene bag into which a stream of nitrogen is blown. After three hours, all yellow color of trifluorothioacetyl fluoride has disappeared. Volatile materials are allowed to escape at room temperature and there remains 11.5 g. of a light yellow liquid. On fractional distillation, there is obtained 9 g. (60% of theory) of 2,4-bis(trifluoromethyl)-2,4-difluoro-1,3-diethietane, B.P. 69° C.; refractive index, $n_D^{25}$, 1.3378.

Analysis.—Calcd. for $C_4F_8S_2$: C, 18.2%; F, 57.6%. Found: C, 18.3%; F, 57.6%.

The trifluorothioacetyl fluoride was obtained as follows (see Example V of my U.S. Pat. 3,069,395):

A mixture of 150 parts of sulfur and 150 parts of pentafluoroethyl iodide is heated for 12 hours at 250° C. and agitated in a reaction vessel capable of withstanding high pressure. The reaction vessel is then cooled and the volatile products are removed by distillation under vacuum. The distillate is shaken with mercury and then redistilled. There is obtained 72.7 parts of pentafluoroethyl disulfide boiling at 78–79° C. and having a refractory index, $n_D^{23}$, of 1.3225.

A solution of 30.2 parts (0.1 mole) of pentafluoroethyl disulfide in 62 parts of 2,2,3,3,4,4,5,5-octafluoropentanethiol (made by reductive thiolation of 2,2,3,3,4,4,5,5-octafluoropentanal with hydrogen sulfide at about 200° C.) is irradiated with a low pressure mercury lamp for four days. A slow stream of nitrogen gas is passed through the reaction mixture during the irradiation and the affluent gases are condensed in a trap cooled by solid carbon dioxide and acetone. The condensate is distilled through a low temperature still and there is obtained 9.1 parts of pentafluoroethanethiol boiling at −6° to −4° C. as a very pale liquid.

Six parts of this pentafluoroethanethiol is slowly vaporized in a stream of nitrogen and passed through a column packed with 50 parts of sodium fluoride pellets and connected to a trap cooled by solid carbon dioxide and acetone. The yellow condensate obtained in the trap is distilled through a low temperature still and there is obtained 5.0 parts of trifluorothioacetyl fluoride boiling at −22° to −21° C. as a bright yellow liquid. The product is identified by examination of its nuclear magnetic resonance spectrum.

Other lower perfluorothioalkanoyl fluorides are obtained in the same manner, e.g., pentafluoropropionyl fluoride is obtained from heptafluoropropyl disulfide.

Although the preceding example illustrates the preparation of 2,4-bis(trifluoromethyl)-2,4-difluoro-1,3-dithietane by the use of ultraviolet light on a solution of a perfluorothioalkanoyl fluoride, alternate methods can be employed. For example, perfluorothioacyl chlorides [for preparation see my copending application Ser. No. 833,-913 filed herewith] can be dimerized by ultraviolet light to 2,4-bis(perfluoroalkyl)-2,4-dichloro-1,3-dithietane which after reaction with antimony trifluoride to replace the chlorine by fluorine gives the corresponding 2,4-bis(perfluoroalkyl)2,4-difluoro-1,3-diethietane. Available by this procedure are 2,4-bis(pentafluoroethyl)-2,4-difluoro-1,3-dithietane and 2,4-bis(heptafluoropropyl)2,4-difluoro-1,3-dithietane.

EXAMPLE II 2,4-Bis(Chlorodifluoromethyl)-2,4-Difluoro-1,3-Dithietane

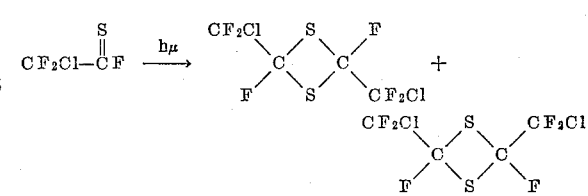

A solution of 38 g. of chlorodifluorothioacetyl fluoride [prepared according to J. Gen. Chem. U.S.S.R.–Eng. Tr.

27, 2301 (1957)] in 25 ml. of dichlorodifluoromethane in a quartz reaction vessel was irradiated at reflux temperature with ultraviolet light for three hours. The dichlorodifluoromethane was evaporated, and the residue was distilled under reduced pressure. There was obtained 31.3 g. of 2,4-bis(chlorodifluoromethyl)2,4-difluoro-1,3-dithietane as a colorless oil, B.P. 44° C./23 mm.; $n_D^{24}$, 1.4131.

*Analysis.*—Calcd. for $C_4Cl_2F_6S_2$: C, 16.17; Cl, 23.87; F, 38.24; S, 21.58. Found: C, 16.68; Cl, 23.84; F, 38.34; S, 21.88.

By the general process of the above Example II, 2,4-bis($\beta$-chlorotetrafluoroethyl) - 2,4 - difluoro-1,3-dithietane can be obtained from $\beta$-chlorotetrafluorothiopropionyl fluoride and 2,4-bis($\gamma$-chlorohexafluoropropyl)-2,4-difluoro-1,3-dithietane from $\gamma$-chlorohexafluorothiobutyryl fluoride. These acyl fluorides are available from the corresponding thioacyl chlorides by treatment of the latter with antimony trifluoride.

The new dithietanes of this invention are unusually stable. Furthermore, in great contrast with related compounds, they are nontoxic. They are also nonflammable, miscible with nonpolar solvents, and do not dissolve polymeric materials. They are liquid at below room temperature and boil above about 70° C. The compounds are stable at temperatures of up to about 400° C. or higher. They have low dielectric constants. They are useful where inert heat transfer media are required, e.g., for transformer fluids in electric transformers. They are also useful as the fluid in transducers, e.g., turbines. When heated above 500–600° C., the dithietanes are converted to the corresponding polyfluoroalkylthioacyl fluorides. For example, trifluoromethylthioacetyl fluoride is obtained by such thermal decomposition of 2,4-bis(trifluoromethyl)2,4-difluoro-1,3-dithietane. Trifluoromethylthioacetyl fluoride is reactive and not stable on storage for extended periods of time. Accordingly, the dithietane provides a convenient source of the thioacyl fluoride.

The polyfluorothioacyl fluorides are useful for the preparation of polymers and unlike the present novel dithietanes, as fumigants. For example, when 300 mg. of trifluorothioacetyl fluoride was introduced into a closed container of about 450 cc. capacity containing 50 adult flies, 100% knockdown of the flies occurred immediately (see the above-mentioned U.S. Pat. 3,069,395).

Since obvious modifications and equivalents in the invention will be evident to those skilled in the chemical arts, I propose to be bound solely by the appended claims.

The embodiments of the invention in which an exclusive property or privilege is claimed are defined as follows:

1. A 2,4-bis(perhaloalkyl)-2,4-difluoro-1,3-dithietane wherein each perhaloalkyl group contains one to three carbons and at most one chlorine, the remainder of the halogen being fluorine.

2. 2,4-bis(trifluoromethyl)-2,4-difluoro-1,3-dithietane.

3. 2,4 - bis(chlorodifluoromethyl) - 2,4 - difluoro - 1,3-dithietane.

References Cited in the file of this patent

UNITED STATES PATENTS

| | | |
|---|---|---|
| 2,851,407 | Nickerson | Sept. 9, 1958 |
| 2,900,392 | Remes et al. | Aug. 18, 1959 |
| 2,905,696 | Fields | Sept. 22, 1959 |
| 2,912,373 | Carlson | Nov. 10, 1959 |

OTHER REFERENCES

Chemical Abstracts, vol. 30, page 693 (1936), abstracting Delepine et al., Bull. Soc. Chim. (5), 2, 1969–80 (1935).

Hauptschein et al.: Journal of the American Chemical Society, vol. 80, pages 853–855 (1958).

Schonberg et al.: Berichte, volume 66, pages 567–71 (1933).